Sept. 30, 1941.  R. W. MEYER  2,257,424
CAMERA
Filed Aug. 31, 1939  2 Sheets-Sheet 1

Inventor
Raymond W. Meyer
By Clarence A. O'Brien
and Hyman Berman
Attorneys

Sept. 30, 1941.   R. W. MEYER   2,257,424
CAMERA
Filed Aug. 31, 1939   2 Sheets-Sheet 2

Inventor
Raymond W. Meyer
By Clarence A. O'Brien
and Hyman Berman
Attorneys

Patented Sept. 30, 1941

2,257,424

UNITED STATES PATENT OFFICE 2,257,424

CAMERA

Raymond W. Meyer, Champaign, Ill.

Application August 31, 1939, Serial No. 292,950

1 Claim. (Cl. 95—31)

The present invention relates to new and useful improvements in miniature and other types of roll film cameras and has for its primary object to provide, in a manner as hereinafter set forth, a camera of this character comprising a detachable or removable film magazine whereby the photographer may conveniently use different types or kinds of films without exposing the films when a change is being made.

Another very important object of the invention is to provide a detachable film magazine which may be used with cameras without the necessity of making material alterations in the operating mechanisms of said cameras.

Other objects of the invention are to provide a camera of the character described which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein.

Figure 1:
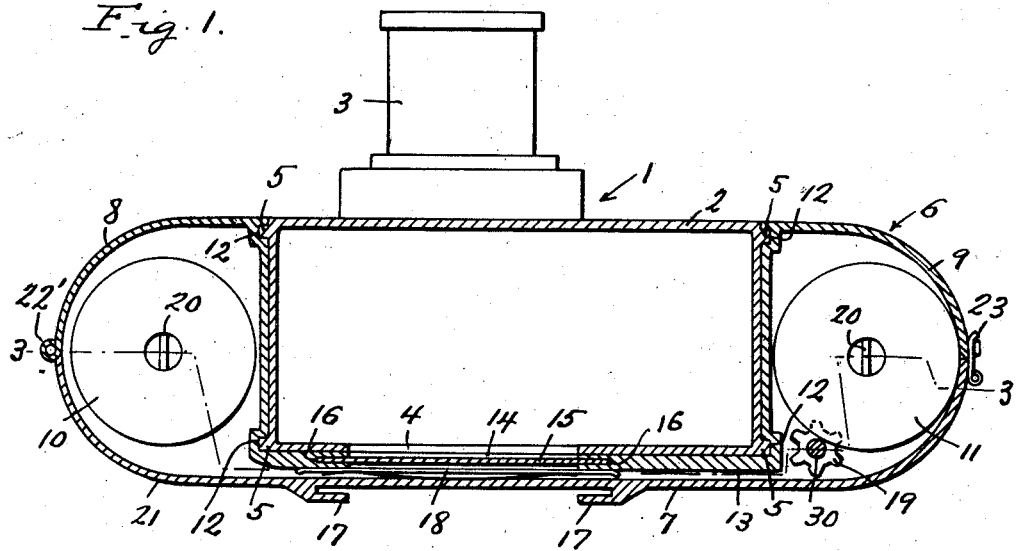
Figure 1 is a view in horizontal section through an embodiment of the invention.

Referring now to the drawings in detail, it will be seen that the reference numeral 1 designates generally what may be referred to as the camera proper. The camera 1 includes a box 2 having mounted thereon the usual lens tube 3. In the back of the box 2 is an exposure opening 4. On the ends of the box 2 are vertical ribs or tongues 5, the purpose of which will be presently set forth.

Mounted on the box 2 is a removable magazine which is designated generally by the reference numeral 6. The magazine 6 comprises a back 7 on the ends of which are film chambers 8 and 9. Removable spools 10 and 11 are mounted in the chambers 8 and 9. The spools 10 and 11 are of conventional construction.

The opposed inner walls of the chambers 8 and 9 have formed therein vertical grooves 12 which slidably receive the tongues 5. The back 7 of the magazine 6 has formed therein a passage 13 through which the film travels. Formed in the front wall of the back 7 is an exposure opening 14 which registers with the opening 4. A slidably mounted shutter 15 is adapted to close the opening 14. The shutter 15 is slidable in channels 16 which are provided therefor in the vertical walls of the opening 14. Guides 17 are provided on the rear of the back 7 for receiving and retaining the shutter 15 when the camera is in use. The reference numeral 18 designates a spring actuated film pressure plate which is mounted in the back 7 over the opening 14.

The reference numeral 19 designates counter sprockets which are journaled in the magazine chamber 9 adjacent one end of the passage 13. Of course, the sprockets 19 are actuated by the film strip as it passes thereover to the spool 11. The upper ends of the spools 10 and 11 are slotted as usual, as at 20. Access to the chambers 8 and 9 may readily be had through the medium of a closure 21 which, it will be noted, constitutes the back of the entire magazine unit 6. The closure 21 is hinged at one end on the chamber 8, as at 22. Suitable means, as at 23, is provided for releasably securing the free end of the closure 21 to the chamber 9. The closure 21 also opens the film passage 13 when said closure is swung to open position.

Figure 2:
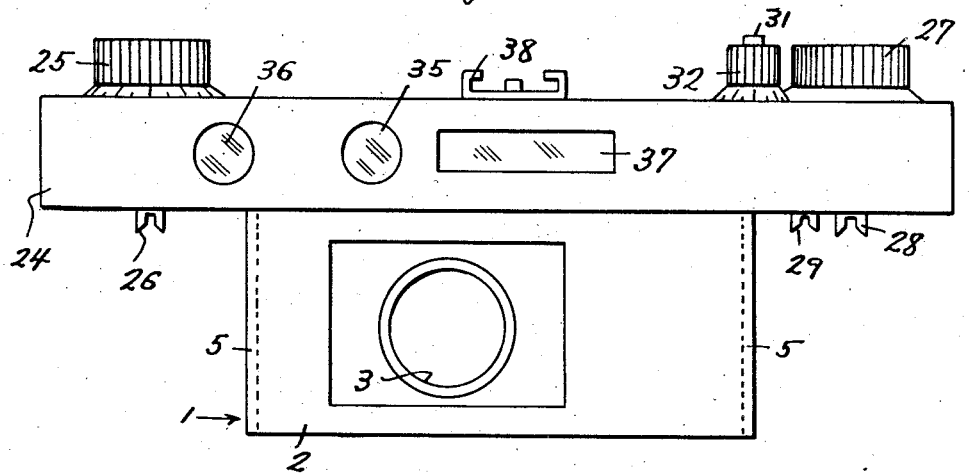
Figure 2 is a view in rear elevation of the camera with the removable film magazine omitted.
Figure 3:
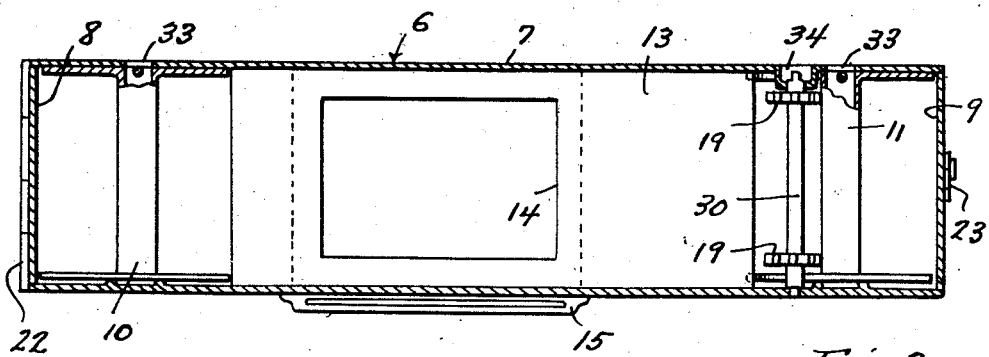
Figure 3 is a vertical longitudinal sectional view through the magazine, taken substantially on the line 3—3 of Figure 1.

Referring now to Figure 2 of the drawings, it will be observed that the camera proper further includes a head 24 from which the box 2 depends, said head projecting beyond the ends of said box. Mounted on one end portion of the head 24 is a film rewinding knob 25 which actuates the shaft 26, said shaft being operatively engageable with the spool 10 in the magazine chamber 8. A film take-up knob 27 is mounted on the other end portion of the head 24 for actuating a shaft 28 which is adapted for operative connection with the spool 11 in the magazine chamber 9. The reference numeral 29 designates a shaft which is engageable with the shaft 30 of the sprockets 19 for actuation by said sprockets. Operatively connected to the shaft 29 is the usual film trip button 31. The button 31 is slidable through the usual shutter operating knob 32 on the head 24. As best seen in Figure 3 of the drawings the tops of the magazine chambers 8 and 9 have formed therein openings 33 which accommodate the elements 26 and 28. A socket 34 receives the element 29.

It may be well to here state that the mechanism in the head 24 is substantially conventional and will be found in the "Perfex" camera. The reference numeral 35 designates a sighting window in the head 24 and 36 designates a range finder window. An exposure meter window is indicated at 37. Mounted on top of the head 24 is an accessory clip 38.

It is thought that the manner in which the camera is used will be readily apparent from a consideration of the foregoing. The magazine unit 6 is loaded and slipped on the box 2, the tongues 5 on said box engaging in the channels or grooves 12. Any suitable means may be provided for locking the magazine 6 in position on the box 2. Of course, when the knob 27 is rotated the spool 11 is actuated for drawing the film from the spool 10. To expose the film when the camera is in use the shutter or slide 15 is removed from the opening 14 and mounted in the retaining guides 17 on the back of the hinged closure 21. It will thus be seen that a camera has been provided wherein the magazine with the film therein may be expeditiously mounted on said camera and removed therefrom as desired. Thus, the photographer may load a plurality of the magazine units 6 with different kinds or types of films which may be conveniently used as desired.

Figure 5:
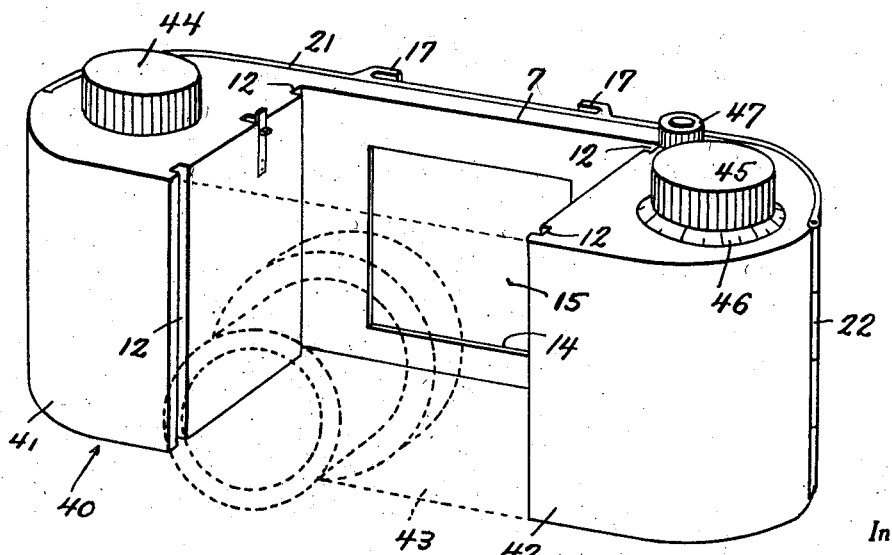
Figure 5 is a perspective view of another form of the invention.

In Figure 5 of the drawings, the reference numeral 40 designates generally a removable magazine unit which is adapted for use with cameras which are not equipped with a winding mechanism, etc. Toward this end, the magazine 40 comprises spool chambers 41 and 42 which are slidable on the camera proper, as at 43. A rewind knob 44 is provided on the chamber 41. The reference numeral 45 designates a film take-up spool winding knob with exposure counter graduations, as at 46, on the magazine chamber 42. The chamber 42 is further provided with a film trip knob 47. In other respects the form of the invention shown in Figure 5 of the drawings is substantially similar in construction and operation to that illustrated in Figures 1, 2 and 3 of said drawings.

Figure 4:
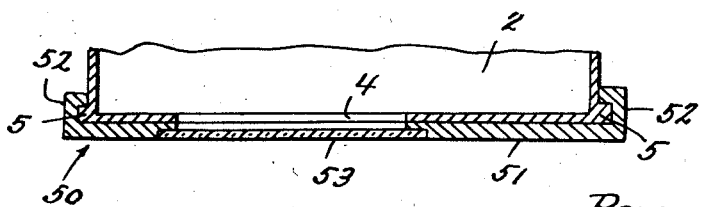
Figure 4 is a view in horizontal section through the attachment which is used for fine focusing or when ground glass focusing is necessary.

In Figure 4 of the drawings, the reference numeral 50 designates generally what may be referred to as a focusing attachment. The attachment 50 comprises a frame 51 which is adapted to be slidably mounted on the back of the camera box 2 after the magazine unit 6 has been removed. Toward this end, the ends of the frame 51 are formed to provide channels 52 which receive the tongues 5 on the rear of the box 2. Mounted in an opening in the frame 51 is a piece of ground glass 53 for registry with the exposure opening 4 in the box 2. With the attachment 50 in position, the camera proper is held rigidly on a suitable holder and the subject is then put into sharp focus. The attachment 50 is then removed from the camera, the loaded magazine is mounted on said camera and the picture is then taken.

It is believed that the many advantages of a camera constructed in accordance with the present invention will be readily understood and although preferred embodiments are as illustrated and described, it is to be understood that further modifications and changes in the details of construction may be resorted to which will fall within the scope of the invention as claimed.

What is claimed is:

A camera comprising a box having an exposure opening in one wall thereof and adapted to carry a lens in an opposite wall, a head on another wall of said box projecting beyond the ends and exposure opening wall thereof, a removable film magazine slidably mounted on the box for movement into engagement with the head, said film magazine including a pair of walls forming a film passage, one of said walls having an exposure opening therein which is alined with the box exposure opening by the sliding engagement and film chambers on the ends of said film passage adapted to receive the box therebetween, said film chambers being adapted for the reception of spools and said film chambers being engageable beneath the end portions of the head with the spools perpendicular to the head, and means on said end portions of the head for actuating the spools in the chambers, the film passage having a slot on the opposite side from the head and a shutter slidably mounted in said slot to close the opening in the passage.

RAYMOND W. MEYER.